(12) United States Patent
Matsuoka et al.

(10) Patent No.: US 9,594,321 B2
(45) Date of Patent: Mar. 14, 2017

(54) BINDER RESIN FOR TONER AND TONER

(71) Applicant: MITSUI CHEMICALS, INC., Minato-ku (JP)

(72) Inventors: Hiroshi Matsuoka, Chiba (JP); Hiroyuki Takei, Kamagaya (JP)

(73) Assignee: MITSUI CHEMICALS, INC., Tokyo (JP)

( * ) Notice: Subject to any disclaimer, the term of this patent is extended or adjusted under 35 U.S.C. 154(b) by 190 days.

(21) Appl. No.: 14/391,050

(22) PCT Filed: May 15, 2013

(86) PCT No.: PCT/JP2013/063541
§ 371 (c)(1),
(2) Date: Oct. 7, 2014

(87) PCT Pub. No.: WO2013/176016
PCT Pub. Date: Nov. 28, 2013

(65) Prior Publication Data
US 2015/0079516 A1     Mar. 19, 2015

(30) Foreign Application Priority Data

May 22, 2012   (JP) .................................. 2012-116628

(51) Int. Cl.
| | | |
|---|---|---|
| C08L 25/14 | (2006.01) | |
| C08L 33/14 | (2006.01) | |
| G03G 9/00 | (2006.01) | |
| G03G 9/13 | (2006.01) | |
| G03G 9/087 | (2006.01) | |
| G03G 9/08 | (2006.01) | |
| G03G 9/09 | (2006.01) | |
| G03G 9/097 | (2006.01) | |

(52) U.S. Cl.
CPC ............ *G03G 9/0874* (2013.01); *C08L 25/14* (2013.01); *C08L 33/14* (2013.01); *G03G 9/081* (2013.01); *G03G 9/08704* (2013.01); *G03G 9/0904* (2013.01); *G03G 9/09791* (2013.01)

(58) Field of Classification Search
None
See application file for complete search history.

(56) References Cited

U.S. PATENT DOCUMENTS

| | | | |
|---|---|---|---|
| 6,235,441 B1 * | 5/2001 | Tanikawa | G03G 9/08722 399/222 |
| 8,679,717 B2 * | 3/2014 | Matsuoka | G03G 9/0874 430/109.1 |
| 2009/0093584 A1 | 4/2009 | Gelles et al. | |
| 2010/0209837 A1 | 8/2010 | Matsuoka et al. | |
| 2012/0101231 A1 | 4/2012 | Gelles et al. | |

FOREIGN PATENT DOCUMENTS

| | | | |
|---|---|---|---|
| JP | 2000-235279 A | 8/2000 | |
| JP | 2005-266788 A | 9/2005 | |
| JP | 2006-171364 A | 6/2006 | |
| JP | 2007-047437 A | 2/2007 | |
| JP | 2008-164677 A | 7/2008 | |
| JP | WO 2009/028177 A1 * | 3/2009 | ............ C08L 25/14 |
| JP | 2011-150239 A | 8/2011 | |
| TW | 200927867 A | 7/2009 | |
| WO | WO 2004/015498 A1 | 2/2004 | |
| WO | WO 2008/075463 A1 | 6/2008 | |
| WO | WO 2009/028177 A1 | 3/2009 | |
| WO | WO 2011/061917 A1 | 5/2011 | |
| WO | WO 2012/017635 A1 | 2/2012 | |

OTHER PUBLICATIONS

International Search Report (PCT/ISA/210) mailed on Jun. 18, 2013, by the Japanese Patent Office as the International Searching Authority for International Application No. PCT/JP2013/063541.
Office Action issued by the Taiwanese Patent Office in corresponding Taiwanese Patent Application No. 10521445690 on Nov. 24, 2016 (5 pages).

* cited by examiner

*Primary Examiner* — Michael J Feely
(74) *Attorney, Agent, or Firm* — Buchanan, Ingersoll & Rooney PC

(57) ABSTRACT

A binder resin for toner includes a carboxy group-containing vinyl resin (C), a glycidyl group-containing vinyl resin (E), a reactant thereof, and a fatty acid metal salt (M), in which the carboxy group-containing vinyl resin (C) includes a high molecular weight vinyl resin (H) having a peak in a region in which the molecular weight is equal to or more than $2.5 \times 10^4$ and equal to or less than $1.2 \times 10^6$ in the molecular weight distribution of a THF soluble content and a low molecular weight vinyl resin (L) having a peak in a region in which the molecular weight is equal to or more than $2 \times 10^3$ and equal to or less than $2 \times 10^4$ in the molecular weight distribution of a THF soluble content. The reactant of the carboxy group-containing vinyl resin (C) and the glycidyl group-containing vinyl resin (E) is formed in the presence of the fatty acid metal salt (M).

6 Claims, No Drawings

BINDER RESIN FOR TONER AND TONER

TECHNICAL FIELD

The present invention relates to a binder resin for toner, and a toner.

BACKGROUND ART

In general, an electrophotographic method in a Plain Paper Copy (PPC) copying machine or a printer in which a toner image formed on a photoreceptor is transferred onto a recording paper is performed by a procedure as follows. First, an electrostatic latent image is formed on the photoreceptor. Next, after the latent image is developed by using a toner and the toner image is transferred onto a sheet to be fixed such as a paper, the toner image is fixed by heating with a heat roll or a film. In this method, since fixing is performed under heating in a state in which the toner on the sheet to be fixed directly comes into contact with a heat roll or a film, fixing is promptly performed and a thermal efficiency is extremely excellent. Therefore, a fixing efficiency is very good.

However, in this heat fixing system, though having an excellent thermal efficiency, since the toner comes into contact with the surface of a heat roll or a film in a melted state, there is a problem which is a so-called offset phenomenon, in which a transfer paper or the like which is sent next is contaminated with the toner which is shifted onto the heat roll at this time.

In addition, a load applied to the toner has been becoming bigger in accordance with high printing speed. There is a problem in which an image defect easily occurs due to the toner being destroyed because of this load, and thus the charged state of the toner being changed. Therefore, high durability is becoming necessary for the toner. However, there is a problem in which the productivity of the toner deteriorates as the strength of a resin increases in order to improve the durability.

Furthermore, since the calorific value which is given to the toner when fixed is reduced in accordance with high printing speed, higher fixing performance is beginning to be demanded.

In order to obtain a toner excellent in a balance among fixing properties, offset resistance, durability, and toner productivity, there has been known a binder resin in which a resin having a high molecular weight and a resin having a low molecular weight are mixed to be used and a high molecular weight part is crosslinked (for example, Patent Documents 1 to 7).

RELATED DOCUMENT

Patent Document

[Patent Document 1] International Publication No. WO 2008/075463
[Patent Document 2] International Publication No. WO 2009/028177
[Patent Document 3] Japanese Unexamined Patent Publication No. 2000-235279
[Patent Document 4] Japanese Unexamined Patent Publication No. 2005-266788
[Patent Document 5] International Publication No. WO 2004/015498
[Patent Document 6] Japanese Unexamined Patent Publication No. 2006-171364
[Patent Document 7] International Publication No. WO 2011/061917

DISCLOSURE OF THE INVENTION

However, it was difficult to obtain a sufficient balance of fixing properties, offset resistance, durability, and toner productivity in the binder resin in Patent Documents 1 to 7.

The present invention is to solve a problem in which such a toner in the related art has and to provide a binder resin for toner and a toner excellent in a balance among fixing properties, offset resistance, durability, and toner productivity.

That is, the present invention includes the following invention.

[1] A binder resin for toner including a carboxy group-containing vinyl rosin (C), a glycidyl group-containing vinyl resin (E), a reactant thereof, and a fatty acid metal salt (M) represented by the following general formula (1):

$$(C_nH_{2n+1}COO)_m\text{-}M \qquad (1)$$

[In the formula, n is an integer of 11 to 22, m is 2, and M is a metal atom selected from Zn and Ca.]

in which the carboxy group-containing vinyl resin (C) includes a high molecular weight vinyl resin (H) having a peak in a region in which the molecular weight is equal to or more than $2.5 \times 10^4$ and equal to or less than $1.2 \times 10^5$ in the molecular weight distribution of a tetrahydrofuran soluble content measured by gel permeation chromatography and a low molecular weight vinyl resin (L) having a peak in a region in which the molecular weight is equal to or more than $2 \times 10^3$ and equal to or less than $2 \times 10^4$ in the molecular weight distribution of a tetrahydrofuran soluble content measured by gel permeation chromatography, and in which the reactant of the carboxy group-containing vinyl resin (C) and the glycidyl group-containing vinyl resin (E) is formed in the presence of the fatty acid metal salt (M).

[2] The binder resin for toner according to [1],
in which the mass ratio (H/L) of the high molecular weight vinyl resin (H) to the low molecular weight vinyl resin (L) in the carboxy group-containing vinyl resin (C) is from 55/45 to 85/15.

[3] The binder resin for toner according to [1] or [2],
in which as to the carboxy group-containing vinyl resin (C), the molecular weight distribution (Mw/Mn) is equal to or more than 6 and equal to or less than 15.

[4] The binder resin for toner according to any one of [1] to [3],
in which the minimum value of a storage elastic modulus (G') is equal to or more than $0.2 \times 10^4$ Pa and equal to or less than $2.0 \times 10^4$ Pa at 150° C. to 200° C. in a measurement frequency of 6.28 radian/second.

[5] The binder resin for toner according to any one of [1] to [4] containing equal to or more than 10% by mass and equal to or less than 40% by mass of a tetrahydrofuran insoluble component with respect to the entire resin.

[6] A toner including the binder resin for toner according to any one of [1] to [5] and a coloring agent.

[7] A method of manufacturing a binder resin for toner, including a step of performing a crosslinking reaction by melting and kneading a carboxy group-containing vinyl resin (C) including a high molecular weight vinyl resin (H) having a peak in a region in which the molecular weight is equal to or more than $2.5 \times 10^4$ and equal to or less than $1.2 \times 10^5$ in the molecular weight distribution of a tetrahydrofuran soluble content measured by gel permeation chromatography and a low molecular weight vinyl resin (L) having a peak in a region in which the molecular weight is equal to or more than $2\times10^3$ and equal to or less than $2\times10^4$ in the molecular weight distribution of a tetrahydrofuran soluble content measured by gel permeation chromatography, and a glycidyl group-containing vinyl resin (E) in the presence of a fatty acid metal salt (M) represented by the following general formula (1):

$$(C_nH_{2n+1}COO)_m\text{-}M \qquad (1)$$

[In the formula, n is an integer of 11 to 22, m is 2, and M is a metal atom selected from Zn and Ca.].

According to the present invention, there is provided a binder resin for toner and a toner excellent in a balance among fixing properties, offset resistance, durability, and toner productivity.

DESCRIPTION OF EMBODIMENTS

Hereinafter, description will be given of the present invention in detail.

In the present invention, the term "polymerization" may be used for the meaning of copolymerization, and the term "polymer" may be used for the meaning of a copolymer. In addition, "to" indicates that both the upper limit value and the lower limit value are included otherwise specifically mentioned.

In the present invention, "GPC" means gel permeation chromatography, and ones as described below are included as a measurement condition.

GPC device: SHODEX (registered trademark) GPC SYSTEM-21 (manufactured by SHOWA DENKO K.K.)

Detector: SHODEX (registered trademark) RI SE-31 (manufactured by SHOWA DENKO K.K.)

Column: SHODEX (registered trademark) one GPC KF-G, three GPC KF-807Ls, and one GPC KF-800D (manufactured by SHOWA DENKO K.K.) are connected in series in this order to be used.

Solvent: Tetrahydrofuran (THF)
Flow rate: 1.2 ml/minute
Sample concentration: 0.002 g-resin/ml-THF
Injected amount: 100 μL
In addition, "peak" indicates a main peak.

[Binder Resin for Toner]

A binder resin for toner in the present invention contains a carboxy group-containing vinyl resin (C), a glycidyl group-containing vinyl resin (E), a reactant thereof, and a fatty acid metal salt (M).

<Fatty Acid Metal Salt (M)>

The binder resin for toner in the present invention is one in which the reactant of the carboxy group-containing vinyl resin (C) and the glycidyl group-containing vinyl resin (E) is formed in the presence of the fatty acid metal salt (M), and contains the fatty acid metal salt (M) represented by the following general formula (1). In the present invention, since the fatty acid metal salt (M) is dispersed at least in the binder resin for toner and a slipping effect is not intended by the fatty acid metal salt (M), the fatty acid metal salt (M) is not segregated on the surface layer of the toner unlike as a fatty acid metal salt included in an external additive such as a lubricant.

$$(C_nH_{2n+1}COO)_m\text{-}M \qquad (1)$$

[In the formula, n is an integer of 11 to 22, m is 2, and M is a metal atom selected from Zn and Ca.]

It is possible to obtain a crosslinked body of the carboxy group-containing vinyl resin (C) with the glycidyl group-containing vinyl resin (E) as a reactant by the fatty acid metal salt (M) functioning as a catalyst in a reaction of the carboxy group-containing vinyl resin (C) with the glycidyl group-containing vinyl resin (E). Since the fatty acid metal salt (M) remains without changing in a crosslinking reaction due to being a catalyst, the fatty acid metal salt (M) is included in the binder resin in the present invention.

The existence of the fatty acid metal salt (M) according to the present invention in the binder resin for toner can be confirmed by the following method. That is, in a case of the binder resin for toner, it is possible to confirm by performing a scanning electron microscope (SEM) at a magnification from 1,000 times to 5,000 times/X-ray microanalyzer (XMA) mapping analysis after trimming and surface shaping. In a case of the toner, firstly, after the toner is embedded in an epoxy resin or the like, it is possible to confirm by the same operation as that of the binder resin. On the other hand, segregation of a metal included in an external additive on the surface layer of the toner can be confirmed by performing a scanning electron microscope (SEM)/X-ray microanalyzer (XMA) mapping analysis.

The fatty acid metal salt (M) in the present invention, for example, a Zn salt and a Ca salt of lauric acid, myristic acid, palmitic acid, stearic acid, and behenic acid, and the like are included, and zinc stearate and calcium stearate are particularly preferable.

The content of the fatty acid metal salt (M) in the present invention is preferably from 0.001 parts by mass to 3 parts by mass, more preferably from 0.05 parts by mass to 2 parts by mass, and further preferably from 0.1 parts by mass to 1 part by mass, with respect to 100 parts by mass of the total amount of the carboxy group-containing vinyl resin (C) and the glycidyl group-containing vinyl resin (E), from the viewpoint of a balance between offset resistance and durability. The fatty acid metal salt (M) acts as a catalyst in the reaction of the carboxy group-containing vinyl resin (C) with the glycidyl group-containing vinyl resin (E). Since the high molecular weight vinyl resin (H) in the present invention has a peak of the molecular weight at the low molecular weight side than that of the related art, the formation speed of the crosslinked body by the crosslinking reaction is slow and the speed of an increase in viscosity is slow. Therefore, it is possible to adjust the binder resin for toner to have an appropriate viscosity by reacting the carboxy group-containing vinyl resin (C) with the glycidyl group-containing vinyl resin (E) in the presence of the fatty acid metal salt (M) which acts as a reactive catalyst.

When the content of the fatty acid metal salt (M) is equal to or more than 0.001 parts by mass, the reaction of the carboxy group-containing vinyl resin (C) with the glycidyl group-containing vinyl resin (E) becomes excellent and the viscosity of the binder resin increases, and as a result, it is possible to more improve offset resistance. In addition, when the content of the fatty acid metal salt (M) is equal to or less than 3 parts by mass, it is possible to obtain the toner having more excellent storage stability and durability.

If the carboxy group-containing vinyl resin (C) can react with the glycidyl group-containing vinyl resin (E) in the presence of the fatty acid metal salt (M), the fatty acid metal salt (M) may be added at any stage of steps of manufacturing the binder resin for toner. It is possible to add the fatty acid metal salt (M) when the carboxy group-containing vinyl resin (C) is manufactured or to add the fatty acid metal salt (M) when the carboxy group-containing vinyl resin (C) reacts with the glycidyl group-containing vinyl resin (E) described below, furthermore, it is possible to combine these addition methods. In addition, it is also possible to add the fatty acid metal salt (M) when the binder resin is manufactured, and further, to add it when the toner is manufactured.

<Carboxy Group-Containing Vinyl Resin (C)>

The carboxy group-containing vinyl resin (C) preferably includes the high molecular weight vinyl resin (H) having a peak in a region in which the molecular weight is equal to or more than $2.5 \times 10^4$ and equal to or less than $1.2 \times 10^5$ in the molecular weight distribution of the THF soluble content measured by GPC and the low molecular weight vinyl resin (L) having a peak in a region in which the molecular weight is equal to or more than $2 \times 10^3$ and equal to or less than $2 \times 10^4$ in the molecular weight distribution of the THF soluble content measured by GPC.

The mass ratio (H/L) of the high molecular weight vinyl resin (H) to the low molecular weight vinyl resin (L) in the carboxy group-containing vinyl resin (C) is preferably from 55/45 to 85/15, and the ratio (H/L) is more preferably from 60/40 to 80/20 and further preferably 60/40 to 75/25, from the viewpoint of the total balance among fixing properties, offset resistance, and durability of the toner. By setting the ratio of the high molecular weight vinyl resin (H) to equal to or more than 55% by mass, it is possible to obtain the toner having more excellent durability and offset resistance, and by setting the ratio thereof to equal to or less than 85% by mass, it is possible to obtain the toner having more excellent fixing properties and productivity.

As to the carboxy group-containing vinyl resin (C), the molecular weight distribution (Mw/Mn) is preferably equal to or more than 6 and equal to or less than 15. By setting the molecular weight distribution to this range, it is possible to obtain the toner having a more excellent balance among fixing properties, offset resistance, and productivity.

As a monomer configuring the carboxy group-containing vinyl resin (C), a styrene-based monomer, and an acryl-based monomer (also including a methacryl-base monomer, hereinafter the same) are included in addition to a carboxy group-containing monomer.

Herein, as a styrene-based monomer used in the present invention, for example, styrene, p-methylstyrene, m-methylstyrene, o-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, and the like are included, and styrene is particularly preferable.

As an acryl-based monomer used in the present invention, for example, acrylic acid esters such as methyl acrylate, ethyl acrylate, propyl acrylate, butyl acrylate, octyl acrylate, cyclohexyl acrylate, stearyl acrylate, benzyl acrylate, furfuryl acrylate, hydroxyethyl acrylate, hydroxybutyl acrylate, dimethylaminomethyl acrylate, or dimethylaminoethyl acrylate, methacrylic acid esters such as methyl methacrylate, ethyl methacrylate, propyl methacrylate, butyl methacrylate, octyl methacrylate, cyclohexyl methacrylate, stearyl methacrylate, benzyl methacrylate, furfuryl methacrylate, hydroxyethyl methacrylate, hydroxybutyl methacrylate, dimethylaminomethyl methacrylate, or dimethylaminoethyl methacrylate, an amide such as acrylamide, methacrylamide, N-substituted acrylamide, or N-substituted methacrylamide, acrylonitrile, methacrylonitrile, and the like are included. Among those, acrylic acid esters, methacrylic acid esters, acrylonitrile, and methacrylonitrile are preferable, and butyl acrylate, methyl methacrylate, butyl methacrylate, and hydroxyethyl acrylate are more preferable.

In the present invention, diesters of an unsaturated dibasic acid such as dimethyl fumarate, dibutyl fumarate, dioctyl fumarate, dimethyl maleate, dibutyl maleate, or dioctyl maleate can also be used as a monomer in addition to the monomers describe above.

As a carboxy group-containing monomer used in the present invention, for example, acrylic acid, methacrylic acid, maleic acid anhydride, maleic acid, fumaric acid, cinnamic acid, monoesters of an unsaturated dibasic acid such as methyl fumarate, ethyl fumarate, propyl fumarate, butyl fumarate, octyl fumarate, methyl maleate, ethyl maleate, propyl maleate, butyl maleate, or octyl maleate, and the like are included. Acrylic acid, methacrylic acid, fumaric acid, methyl fumarate, ethyl fumarate, propyl fumarate, butyl fumarate, and octyl fumarate are preferable, and acrylic acid and methacrylic acid are particularly preferable.

For the carboxy group-containing vinyl resin (C) in the present invention, a multifunctional monomer having two or more double bonds may be used as a monomer, as necessary. For example, an aromatic divinyl compound such as divinyl benzene or divinyl naphthalene, a diacrylate compound such as ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyoxyethylene(2)-2,2-bis(4-hydroxyphenyl)propane diacrylate, or polyoxyethylene(4)-2,2-bis(4-hydroxyphenyl)propane diacrylate and a methacrylate compound thereof, a multifunctional monomer such as pentaerythritol triacrylate, trimethylolethane triacrylate, brimethylolpropane triacrylate, or tetramethylolmethane tetraacrylate and a methacrylate compound thereof, and the like are included.

In a case where these multifunctional monomers are used, the ratio of these multifunctional monomers is preferably equal to or less than 0.5% by mass with respect to 100% by mass of other monomers in a vinyl resin containing a carboxy group. A crosslinked body produced by a reaction of a carboxy group with a glycidyl group described below is hardly cut when the toner is manufactured, by setting the ratio to equal to or loss than 0.5% by mass.

In the present invention, as a method of manufacturing the carboxy group-containing vinyl resin (C), a well-known polymerization method such as solution polymerization, mass polymerization, suspension polymerization, or emulsion polymerization and a combination thereof can be employed, however, solution polymerization is suitably employed in terms of adjustment of the molecular weight distribution, mixing properties of the high molecular weight vinyl resin (H) and the low molecular weight vinyl resin (L) described below, and convenience of distribution adjustment of a carboxy group and a glycidyl group.

It is possible to obtain the carboxy group-containing vinyl resin (C) in the present invention by respectively polymerizing the high molecular weight vinyl resin (H) and the low molecular weight vinyl resin (L) alone in advance and then mixing them in a melted state or a solution state. In addition, it is also possible to obtain the carboxy group-containing vinyl resin (C) by polymerizing one of the high molecular weight vinyl resin (H) or the low molecular weight vinyl resin (L) alone, and then polymerizing the other vinyl resin in the presence of the former vinyl resin.

As a solvent used for solution polymerization, an aromatic hydrocarbon such as benzene, toluene, ethylbenzene, xylene, or cumene is included, these are used alone or as a mixture thereof, and, xylene is preferable.

The polymerization may be performed by using a polymerization initiator or so-called thermal polymerization may be performed without using a polymerization initiator. As a polymerization initiator, a polymerization initiator capable of being used as a radical polymerization initiator can be usually used. For example, an azo-based initiator such as 2,2'-azobisisobutyronitrile, 2,2'-azobis(4-methoxy-2,4-dimethylvaleronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, or 2,2'-azobis(2-methyl-propane), ketone peroxides such as methylethylketone peroxide, acetylacetone peroxide, or cyclohexanone peroxide, peroxy ketals such as 1,1-bis(t-butylperoxy)-3,3,5-trimethylcyclohexane, 1,1-bis(butylperoxy)cyclohexane, or 2,2-bis(t-butylperoxy)butane, hydroperoxides such as t-butyl hydroperoxide, cumene hydroperoxide, or 1,1,3,3-tetramethylbutyl hydroperoxide, dialkyl peroxides such as di-t-butyl peroxide, t-butylcumyl peroxide, di-cumyl peroxide, 2,5-dimethyl-2,5-di(t-butylperoxy)hexane, or α,α'-bis(t-butylperoxyisopropyl)benzene, diacyl peroxides such as isobutyryl peroxide, octanoyl peroxide, decanoyl peroxide, lauroyl peroxide, 3,5,5-trimethylhexanoyl peroxide, benzoyl peroxide, or m-toluoyl peroxide, peroxydicarbonates such as di-isopropyl peroxydicarbonate, di-2-ethylhexyl peroxydicarbonate, di-n-propyl peroxydicarbonate, di-2-ethoxyethyl peroxydicarbonate, di-methoxyisopropyl peroxydicarbonate, or di(3-methyl-3-methoxybutyl)peroxydicarbonate, sulfonyl peroxides such as acetylcyclohexyl sulfonyl peroxide, peroxyesters such as t-butyl peroxyacetate, t-butyl peroxyisobutyrate, t-butyl peroxyneodecanoate, cumyl peroxyneodecanoate, t-butyl peroxy-2-ethylhexanoate, t-butyl peroxy laurate, t-butyl peroxy benzoate, t-butyl peroxy isopropyl carbonate, or di-t-butyldiperoxy isophthalate, and the like can be exemplified. These initiators may be used alone or may be used in combination of two or more kinds thereof.

The type and the amount of the polymerization initiator can be appropriately selected to be used, depending on the reaction temperature, the concentration of the monomer, or the like, and 0.01 parts by mass to 10 parts by mass of the polymerization initiator is usually used with respect to 100 parts by mass of the monomer which is used.

The carboxy group-containing vinyl resin (C) may further include at least one kind selected from a block copolymer consisting of a block consisting of a sequence of a constitutional unit derived from ethylene-based hydrocarbon and/or conjugated diene-based hydrocarbon and a block consisting of a sequence derived from styrene, and a hydrogen additive thereof, that is, a hydrogen additive block copolymer.

The content of the block copolymer and the hydrogen additive block copolymer is preferably equal to or more than 0.05 parts by mass and equal to or less than 1.5 parts by mass and more preferably equal to or more than 0.1 parts by mass and equal to or less than 1.0 part by mass, with respect to 100 parts by mass of the carboxy group-containing vinyl resin (C). It is possible to disperse a releasing agent in the binder resin without deteriorating storage stability and fluidity of the toner by setting the content to within the range described above. In doing so, it becomes easier to obtain the toner excellent in contamination resistance of a photoreceptor.

In order to obtain these block copolymers, one or more kinds selected from ethylene-based hydrocarbon such as ethylene, propylene, 1-butene, 2-butene, isobutylene, 1-pentene, 2-pentene, 2-methyl-1-butene, 3-methyl-1-butene, 2-methyl-2-butene, 1-hexene, or 2,3-dimethyl-2-butene and conjugated diene-based hydrocarbon such as butadiene or isoprene may generally be used. These block copolymers are manufactured by a method of using a reactive group in the block copolymer produced by a well-known living anion polymerization or living cation polymerization using these, and then blocking this reactive group with styrene, or the like. However, the method of manufacturing is not limited thereto and one which is manufactured by another well-known method of manufacturing in the related art may be used. Furthermore, there is sometimes one having an unsaturated double bond among the block copolymers. These may also be used as a hydrogen additive by reacting an unsaturated double bond with hydrogen by a well-known method.

As the block copolymer, Kraton (a styrene-ethylene/butylene-styrene-based block copolymer (SEBS), a styrene-butadiene-styrene-based block copolymer, a styrene-isoprene-styrene-based block copolymer, a styrene-ethylene/propylene-styrene-based block copolymer, or a styrene-ethylene/propylene-based block copolymer) manufactured by Kraton Performance Polymers, Inc., SEPTON (a styrene-ethylene/propylene-based block copolymer or a hydrogenerated substance of a styrene-isoprene-based block copolymer) manufactured by KURARAY CO., LTD., Tufprene (a styrene-butadiene-based block copolymer) manufactured by Asahi Kasei Corporation, and the like are included as a commercially available product.

The acid value of the carboxy group-containing vinyl resin (C) is preferably from 5 mgKOH/g to 30 mgKOH/g. The acid value is more preferably from 10 mgKOH/g to 25 mgKOH/g and further preferably from 15 mgKOH/g to 20 mgKOH/g. By setting the acid value to equal to or more than 5 mgKOH/g, the reaction with the glycidyl group-containing vinyl resin (E) described below sufficiently proceeds, and as a result, it is possible to obtain the toner having more excellent offset resistance. On the other hand, by setting the acid value to equal to or less than 30 mgKOH/g, a carboxyl group-containing monomer becomes hardly unevenly distributed in the resin and thus the composition in the resin hardly becomes nonuniform. As a result, the toner becomes a toner having more excellent durability.

Moreover, in the present invention, the acid value refers to the number of mg of potassium hydroxide that is required to neutralize 1 g of a resin.

<High Molecular Weight Vinyl Resin (H)>

In the present invention, as to the high molecular weight vinyl resin (H), the THF soluble content preferably have a peak in a region in which the molecular weight is preferably equal to or more than $2.5 \times 10^4$ and equal to or less than $1.2 \times 10^5$ in the molecular weight distribution measured by GPC, and it is preferable for the THF soluble content to have a peak in which the molecular weight is more preferably equal to or more than $3 \times 10^4$ and equal to or less than $1 \times 10^5$ in order to realize an excellent balance of fixing properties, offset resistance, and durability. By setting the peak molecular weight to equal to or more than $2.5 \times 10^4$, the strength of the resin is enhanced, and thus it is possible to obtain the toner, having more excellent durability. In addition, since the crosslinking formation sufficiently proceeds in the formation of a crosslinked body by the reaction with a glycidyl group described below, it is possible to obtain the toner having excellent offset resistance. In addition, by setting the peak molecular weight to equal to or less than $1.2 \times 10^5$, even if the high molecular weight vinyl resin remains in an unreacted state, the viscosity of the toner when fixed hardly increases, and thus it is possible to obtain the toner having more excellent fixing properties. In addition, the strength of the resin also becomes moderate, and thus it is possible to produce the toner having more excellent productivity.

It is preferable that the acid value (AVH) of the high molecular weight vinyl resin (H) is from 15 mgKOH/g to 35 mgKOH/g and more preferably from 19 mgKOH/g to 27 mgKOH/g, in terms of fixing properties and offset resistance of the toner. When the acid value is equal to or more than 15 mgKOH/g, the high molecular weight vinyl resin (H) easily reacts with the glycidyl group-containing vinyl resin described below and it is possible to produce the toner having more excellent offset resistance. When the acid value is equal to or less than 35 mgKOH/g, an excessive crosslinking reaction with the glycidyl group-containing vinyl resin is suppressed, and as a result, the loss modulus in the fixing temperature range of the toner becomes moderate, and thus it is possible to produce the toner having more excellent fixing properties.

The high molecular weight vinyl resin (H) may not necessarily be a single polymer, and two or more kinds of high molecular weight vinyl resins may be used. In this case, the high molecular weight vinyl resin (H) preferably satisfies the characteristics described above as a whole. In addition, when the single polymer is produced, it is also possible to add the carboxyl group-containing monomer during the polymerization or add separately at the beginning and end of polymerization.

<Low molecular weight vinyl resin (L)>

In the present invention, as to the low molecular weight vinyl resin (L), the THF soluble content preferably has a peak in which the molecular weight is equal to or more than $2\times10^3$ and equal to or less than $2\times10^4$ in the molecular weight distribution measured by GPC, and it is more preferable for the THF soluble content to have a peak in which the molecular weight is equal to or more than $4\times10^3$ and equal to or less than $1.6\times10^4$ from the viewpoint of fixing properties, durability, and productivity of the toner. By setting the peak molecular weight to equal to or more than $2\times10^3$, it is possible to produce the toner having more excellent durability. By setting the peak molecular weight to equal to or less than $2\times10^4$, it is possible to obtain the toner having more excellent fixing properties and productivity.

The acid value (AVL) of the low molecular weight vinyl resin (L) is preferably from 1 mgKOH/g to 10 mgKOH/g, and is more preferably from 2 mgKOH/g to 8 mgKOH/g in order to exhibit excellent fixing performance and offset resistance performance. By setting the acid value (AVL) to equal to or more than 1 mgKOH/g, the compatibility with the high molecular weight vinyl resin (H) becomes excellent and the toner having more excellent durability and offset resistance is produced, and by setting the acid value to equal to or less than 10 mgKOH/g, since it is possible to suppress inhibiting the reaction of the glycidyl group-containing vinyl resin (E) with the high molecular weight vinyl resin (H) by the low molecular weight vinyl resin (L) and it is possible to suppress increasing the molecular weight of the low molecular weight vinyl resin (L) itself, it is possible to obtain the toner more excellent in a balance between offset resistance and fixing properties.

The low molecular weight vinyl resin (L) may not necessarily be a single polymer, and two or more kinds of low molecular weight vinyl resins may be used. At this time, the low molecular weight vinyl resin (L) preferably satisfies the characteristics described above as a whole. In addition, when the single polymer is produced, it is also possible to add the carboxyl group-containing monomer during the polymerization or add separately at the beginning and end of polymerization.

<Glycidyl Group-Containing Vinyl Resin (E)>

The glycidyl group-containing vinyl resin (E) in the present invention can be obtained by using a well-known polymerization method using at least one kind of styrene-based monomer or acryl-based monomer (also including a methacryl-based monomer) and at least one kind of glycidyl group-containing monomer.

As a styrene-based monomer and an acryl-based monomer (also including a methacryl-based monomer) in the present invention, the monomer exemplified in the explanation of the carboxy group-containing vinyl resin (C) is suitable.

As a glycidyl group-containing monomer in the present invention, glycidyl acrylate, β-methyl glycidyl acrylate, glycidyl methacrylate, β-methyl glycidyl methacrylate, or the like are suitable and glycidyl methacrylate and β-methyl glycidyl methacrylate are preferable.

As to the glycidyl group-containing vinyl resin (E), the THF soluble content has a peak in a range in which the molecular weight is preferably equal to or more than $3\times10^4$ and equal to or less than $7\times10^4$ and more preferably equal to or more than $4\times10^4$ and equal to or less than $6\times10^4$ in the molecular weight distribution measured by GPC. In addition, the epoxy value is set preferably from 0.003 Eq/100 g to 0.100 Eq/100 g and more preferably from 0.005 Eq/100 g to 0.060 Eq/100 g. When the peak molecular weight and the epoxy value of the glycidyl group-containing vinyl resin (E) is equal to or more than the lower limit value described above, durability becomes excellent when producing the toner and the deterioration of an image does not occur due to the destruction of toner during continuous printing over a long period of time, that is, development maintenance characteristics are enhanced. In addition, at the same time, since the molecular weight of a high molecular weight component further increases and moderate elasticity is imparted to the binder resin by the reaction of the carboxy group-containing vinyl resin (C) with the glycidyl group-containing vinyl resin (E), offset resistance performance becomes more excellent. By setting the peak molecular weight to equal to or more than $3\times10^4$ and setting the epoxy value to equal to or more than 0.003, moderate elasticity is imparted to the binder resin, and thus it is possible to obtain the toner having more excellent offset resistance. In addition, by setting the peak molecular weight to equal to or less than $7\times10^4$ and setting the epoxy value to equal to or less than 0.100 Eq/100 g, it is possible to suppress excessive elasticity of the binder resin, and thus it is possible to obtain the toner having more excellent fixing properties.

Moreover, in the present invention, the epoxy value refers to the number of moles of an epoxy group that exists in 100 g of a resin, and the measurement can be performed in accordance with JIS K-7236.

The glycidyl group-containing vinyl resin (E) may not necessarily be a single polymer, and two or more kinds of glycidyl group-containing vinyl resins may be used. In this case, the glycidyl group-containing vinyl resin (E) preferably satisfies the characteristics described above as a whole. In addition, when the single polymer is produced, it is also possible to add the glycidyl group-containing monomer during the polymerization or add separately at the beginning and end of polymerization.

<Binder Resin>

The binder resin for toner in the present invention includes a crosslinked component produced by the reaction of a carboxy group derived from the carboxy group-containing vinyl resin (C) with a glycidyl group derived from the glycidyl group-containing vinyl resin (E), and includes the THF insoluble component derived therefrom. It is more preferable that the THF insoluble component is preferably from 10% by mass to 40% by mass, more preferably from 15% by mass to 30% by mass, and further preferably from 20% by mass to 25% by mass in the binder resin, from the viewpoint of an excellent balance among fixing properties, offset resistance, durability, and toner productivity. By setting the THF insoluble component to equal to or more than 10% by mass, it is possible to produce the toner having more excellent offset resistance, and furthermore, when a toner member such as a releasing agent, a charge controlling agent, a coloring agent, or a magnetic powder and the binder resin in the present invention are kneaded and pulverized to produce the toner, a sufficient shear at kneading is applied, the dispersion of the toner member becomes excellent, the electrification is uniformized, a decrease in environmental stability performance is suppressed, and thus it is possible to obtain an excellent development performance. By setting the THF insoluble component to equal to or less than 40% by mass, the toner having more excellent fixing performance is obtained and the low molecular weight component and the crosslinked body are prevented from being excessively separated, and thus the offset resistance is further improved. In addition, since the toner does not become hard, it is possible to enhance the productivity of the toner.

In addition, as to the binder resin for toner in the present invention, the minimum value ($G'_{min}$) of a storage elastic modulus (G') is preferably from $0.2 \times 10^4$ Pa to $2.0 \times 10^4$ Pa in a temperature range from 150° C. to 200° C. in a measurement frequency of 6.28 radian/second, and furthermore, is more preferably from $0.4 \times 10^4$ Pa to $1.5 \times 10^4$ Pa from the viewpoint of a balance among fixing properties, offset resistance, and durability. By setting $G'_{min}$ to equal to or more than $0.2 \times 10^4$ Pa, it is possible to produce the toner having more excellent offset resistance and durability. By setting $G'_{min}$ to equal to or less than $2.0 \times 10^4$ Pa, it is possible to produce the toner having more excellent fixing properties.

The glass transition temperature (Tg) measured by DSC of the binder resin in the present invention is preferably equal to or higher than 45° C. and equal to or lower than 65° C., and more preferably equal to or higher than 50° C. and equal to or lower than 60° C. from the viewpoint of low-temperature fixing properties and storage stability. By setting the Tg to equal to or higher than 45° C., the toner becomes excellent in storage stability, and by setting the Tg to equal to or lower than 65° C., the toner becomes excellent in low-temperature fixing properties.

The preferred binder resin used in the present invention contains at least the carboxy group-containing vinyl resin (C) and the glycidyl group-containing vinyl resin (E), and the ratio (C/E) of the carboxy group-containing vinyl resin (C) to the glycidyl group-containing vinyl resin (E) is from 87/15 to 99/1 and preferably from 90/10 to 97/5 as a mass ratio, from the viewpoint of offset resistance. By setting the ratio of the glycidyl group-containing vinyl resin (E) to equal to or less than 15% by mass, it is possible to produce the toner having more excellent offset resistance. In addition, by setting the ratio of the glycidyl group-containing vinyl resin (E) to equal to or more than 1% by mass, since the appropriate amount of the crosslinked component is produced by the reaction of the carboxy group-containing vinyl resin with the glycidyl group-containing vinyl resin, it is possible to produce the toner having more excellent offset resistance.

As a method of reacting the carboxy group-containing vinyl resin (C) with the glycidyl group-containing vinyl resin (E), a method of mixing the carboxy group-containing vinyl resin (C) and the glycidyl group-containing vinyl resin (E) in a melted state to be reacted in the presence of at least the fatty acid metal salt (M) is preferable from the viewpoint of offset resistance and durability. As to such a method, any well-known method in the related art, for example, a method in which both resins are put into a reactor vessel with a mixer or the like and heated to be reacted in a melted state or a method of reacting in the presence of a solvent and then removing a solvent can be employed, however, in particular, a method using a twin screw kneader is preferable. Specifically, a method of melting and kneading to be reacted using a twin screw kneader after the carboxy group-containing vinyl resin (C), the glycidyl group-containing vinyl resin (5), and the fatty acid metal salt (M) are mixed by a Henschel mixer and a method of melting and kneading to be reacted after the carboxy group-containing vinyl resin (C), the glycidyl group-containing vinyl resin (5), and the fatty acid metal salt (M) in a melted state are fed to a twin screw kneader are included.

A temperature when melting and kneading, and reacting differs depending on the amount of a functional group and the molecular weight of the carboxy group-containing vinyl resin (C) and the glycidyl group-containing vinyl resin (E), however, the temperature is preferably in a range from 100° C. to 220° C., more preferably from 120° C. to 200° C., and further preferably from 130° C. to 200° C. By setting the reaction temperature to equal to or higher than 100° C., the formation of the crosslinked body becomes excellent, a shear at kneading becomes moderate, and the formed crosslinked body is prevented from being cut, and thus it is possible to obtain the toner excellent in offset resistance. By setting the reaction temperature to equal to or lower than 220° C., the crosslinked reaction is prevented from excessively proceeding, a phase separation of a crosslinked component and an uncrosslinked component is suppressed, and thus it is possible to obtain the toner excellent in offset resistance. In addition, the depolymerization is suppressed and it is possible to reduce fear in which a problem such as development maintenance characteristics or odor of the toner by the residual volatile matter in the binder resin occurs.

In a method of melting and kneading to be reacted using a twin screw kneader, there is also a method of removing water and a volatile component by injecting water from an injection opening into a twin screw kneader and reducing the pressure from a decompression opening which is arranged on the exit side than an injection opening. Water is sufficiently mixed with the resin by this method, and a volatile component such as a monomer or a solvent remained in the resin becomes easier to be removed when reducing the pressure.

It is possible to produce the binder resin for toner by cooling down and pulverizing the resin thus obtained. As a method of cooling down and pulverizing, any well-known method in the related art can also be employed. In addition, as a method of cooling down, it is also possible to rapidly cool down by using a steel belt cooler or the like.

[Toner]

Another aspect in the present invention is a toner including the binder resin for toner and a coloring agent.

<Coloring Agent>

As a coloring agent, a well-known pigment and dye in the related art can be used.

As a pigment, for example, Mineral Fast Yellow, Navel Yellow, Naphthol Yellow S, Hansa Yellow G, Permanent Yellow NCG, Tartrazine Lake, Molybdenum Orange, Permanent Orange GTR, Pyrazolone Orange, Benzidine Orange G, Permanent Red 4R, Watching Red Calcium Salt, Eosine Lake, Brilliant Carmine 3B, Manganese Violet, Fast Violet B, Methyl Violet Lake, Cobalt Blue, Alkali Blue Lake, Victoria Blue Lake, Phthalocyanine Blue, Fast Sky Blue, Indanthrene Blue BC, Chrome Green, Pigment Green B, Malachite Green Lake, Final Yellow Green G, and the like are included. As a coloring pigment for magenta, C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209, and 238, C.I. Pigment Violet 19, C. I. Vat Red 1, 2, 10, 13, 15, 23, 29, and 35, and the like are included. As a coloring pigment for cyan, C.I. Pigment Blue 2, 3, 15, 15:1, 15:2, 15:3, 16, and 17, C.I. Acid Blue 6, C.I. Acid Blue 45, a copper phthalocyanine pigment in which a phthalocyanine skeleton is substituted with 1 to 5 phthalimidomethyl groups, and the like are included. As a coloring pigment for yellow, C.I. Pigment Yellow 1, 2, 3, 4, 5, 6, 7, 10, 11, 12, 13, 14, 15, 16, 17, 23, 65, 73, 74, 83, 93, 97, 155, 180, and 185, C.I. Vat Yellow 1, 3, and 20, and the like are included. As a black pigment, carbon black such as furnace black, channel black, acetylene black, thermal black, or lamp black, and the like are included. As a dye, C.I. Direct Red 1, C.I. Direct Red 4, C.I. Acid Red 1, C.I. Basic Red 1, C.I. Mordant Red 30, C. I. Direct Blue 1, C.I. Direct Blue 2, C.I. Acid Blue 9, C.I. Acid Blue 15, C. I. Basic Blue 3, C.I. Basic Blue 5, C.I. Mordant Blue 7, C.I. Direct Green 6, C.I. Basic Green 4, C. I. Basic Green 6, Solvent Yellow 162, and the like are included.

These coloring agents may be used alone or may be use in combination of two or more kinds thereof.

The content of the coloring agent in the toner is preferably from 0.05 parts by mass to 20 parts by mass, more preferably from 0.1 parts by mass to 15 parts by mass, and further preferably from 0.2 parts by mass to 10 parts by mass, with respect to 100 parts by mass of the binder resin.

In addition, a magnetic body can also be used as a substitute for these coloring agents. As a magnetic material, a metallic oxide including an element such as iron, cobalt, nickel, copper, magnesium, manganese, aluminum, or silicon, and the like are included, and specifically, triiron tetraoxide, diiron trioxide, zinc iron oxide, yttrium iron oxide, cadmium iron oxide, gadolinium iron oxide, copper iron oxide, lead iron oxide, nickel iron oxide, neodymium iron oxide, barium iron oxide, magnesium iron oxide, manganese iron oxide, lanthanum iron oxide, an iron powder, a cobalt powder, a nickel powder, and the like are included. These magnetic materials may be used in combination of two or more kinds thereof, as necessary. In addition, as a shape thereof, it is preferable to use one in spherical shape, octahedron, or hexahedron, and furthermore, it is preferable to use one in spherical shape in terms of uniformly dispersing the magnetic powder in the toner.

It is preferable to use one in which a BET specific surface area of the magnetic powder by a nitrogen adsorption method is from 1 $m^2/g$ to 30 $m^2/g$ and it is more preferable to use one in which that of the magnetic powder is from 2 $m^2/g$ to 20 $m^2/g$, and furthermore, it is preferable to use the magnetic powder in which a Mohs hardness is from 4 to 8. The average particle diameter of the magnetic body is preferably from 0.01 μm to 0.8 μm and it is more preferable to use one having an average particle diameter from 0.05 μm to 0.5 μm. In addition, as magnetic characteristics of the magnetic material, when 795.8 kA/m is applied, one in which the coercive force is from 1 kA/m to 20 kA/m, the saturation magnetization is from 50 $Am^2/kg$ to 200 $Am^2/kg$, and the residual magnetization is from 1 $Am^2/kg$ to 20 Are/kg is preferable.

The content of the magnetic body is preferably from 4 parts by mass to 200 parts by mass, more preferably from 10 parts by mass to 170 parts by mass, and further preferably from 20 parts by mass to 150 parts by mass, with respect to 100 parts by mass of the binder resin.

In addition, the toner in the present invention may be used by partially adding as necessary, for example, polyvinyl chloride, polyvinyl acetate, polyester, polyvinyl butyral, polyurethane, polyamide, polystyrene, a rosin, a polymerized rosin, a modified rosin, a terpene resin, a phenol resin, an aromatic petroleum resin, a vinyl chloride resin, a styrene-butadiene resin, a styrene-(meth)acrylic copolymer, a chromane-indene resin, a melamine resin, or the like, in a range in which an effect of the present invention is not hindered. Furthermore, a crystalline resin such as crystalline polyester having a melting point from 50° C. to 150° C. can also be added.

In addition, for the purpose of improving a pigment dispersion, a method in which the coloring agent is dispersed in the binder resin or these raw material resins in advance, that is, a master batch is manufactured and these are added to the toner may be performed. Specifically, from 20% by mass to 60% by mass of the coloring agent and from 80% by mass to 40% by mass of the resin component are mixed in a powder state, one in which the obtained mixture is kneaded by a twin screw kneader, an open roll kneader, a batch type kneader such as a pressure kneader, or the like and then it is pulverized, may be used when the toner is manufactured.

<Releasing Agent>

The toner in the present invention preferably includes a releasing agent in order to exhibit excellent fixing performance and offset resistance performance.

As a releasing agent, a well-known one in the related art can be used, however, for example, aliphatic hydrocarbon-based wax such as low molecular weight polyethylene, low molecular weight polypropylene, a polyolefin copolymer, polyolefin wax, paraffin wax, microcrystalline wax, or Fischer-Tropsch wax; an oxide of aliphatic hydrocarbon-based wax such as polyethylene oxide wax; vegetable-based wax such as candelilla wax, carnauba wax, Japan wax, rice wax, or jojoba wax; animal-based wax such as bee wax, lanoline, or whale wax; mineral-based wax such as ozokerite, ceresine, or petrolatum; wax mainly containing fatty acid ester such as montanic acid ester or castor wax; wax in which fatty acid ester such as deacidified carnauba wax is partially or entirely deacidified; linear saturated fatty acid such as palmitic acid, stearic acid, montanic acid, or long chain alkyl carboxylic acids further having a long chain alkyl group; unsaturated fatty acid such as brassidic acid, eleostearic acid, or parinaric acid; saturated alcohol such as stearyl alcohol, eicosyl alcohol, behenyl alcohol, carnaubyl alcohol, ceryl alcohol, melissyl alcohol, or long chain alkyl alcohol further having a long chain alkyl group; polyhydric alcohol such as sorbitol; fatty acid amide such as linoleic acid amide, oleic acid amide, or lauric acid amide; saturated fatty acid bisamide such as methylene bisstearic acid amide, ethylene biscapric acid amide, ethylene bislauric acid amide, or hexamethylene bisstearic acid amide; unsaturated fatty acid amide such as ethylene bisoleic acid amide, hexamethylene bisoleic acid amide, N,N'-dioleyl adipic acid amide, or N, N'-dioleyl sebacic acid amide; aromatic-based bisamide such as m-xylene bisstearic acid amide or N,N'-distearyl isophthalic acid amide; wax formed by grafting a vinyl monomer such as a styrene-based monomer, an acrylic-based monomer, a carboxyl group-containing monomer, and a glycidyl group-containing monomer to aliphatic hydrocarbon wax; a partially esterified compound of aliphatic and polyhydric alcohol such as behenic acid monoglyceride; a methyl ester compound having a hydroxyl group obtained by hydrogenating a vegetable oil; polyethylene, polypropylene, polybutene, polypentene, polyhexene, polyheptene, polyoctene, an ethylene-propylene copolymer, an ethylene-butene copolymer, or a butene-propylene copolymer synthesized by a metallocene catalyst, an ester group-containing wax obtained by condensing long chain alkyl carboxylic acid and polyhydric alcohol or reacting a halide of long chain alkyl carboxylic acid with polyhydric alcohol, and the like are included. Furthermore, wax having a functional group such as a hydroxyl group, an ester group, or a carboxyl group is included. The wax is obtained by liquid-phase oxidation of a higher aliphatic hydrocarbon having one or more double bonds obtained by an ethylene polymerization method or an olefination method by thermally decomposing an petroleum-based hydrocarbon, an n-paraffin mixture obtained from a petroleum fraction, polyethylene wax obtained by an ethylene polymerization method, or a higher aliphatic hydrocarbon obtained by a Fischer-Tropsch synthesis method, by using a molecular oxygen-containing gas in the presence of boric acid and anhydrous boric acid.

These releasing agents may be used alone or may be used in combination of two or more kinds thereof.

In order to improve the dispersion state in the toner, these releasing agents can be added in a step of manufacturing the high molecular weight vinyl resin (H), the low molecular weight vinyl resin (L), the carboxy group-containing vinyl resin (C), and the glycidyl group-containing vinyl resin (E), in a step of reacting the carboxy group-containing vinyl resin (C) with the glycidyl group-containing vinyl resin (E), or separately in respective steps. In addition, a method in which the releasing agent is added to a mixture of the carboxy group-containing vinyl resin (C) and the solvent to be mixed in the coexistence of a block copolymer consisting of a block consisting of a sequence of a constitutional unit derived from ethylenic-based hydrocarbon and/or conjugated diene-based hydrocarbon and a block consisting of a sequence derived from styrene, and/or a hydrogen additive thereof, that is, a hydrogen additive block copolymer, and then devolatilization is performed in manufacturing the carboxy group-containing vinyl resin (C), is also preferable. However, these addition methods are not limited, the releasing agent can be add by the method described above or a combination thereof, and further as necessary, the releasing agent can also be added when the toner is manufactured.

In the present invention, the content of the releasing agent is preferably equal to or more than 1 part by mass and equal to or less than 10 parts by mass with respect to the total amount of 100 parts by mass of the carboxy group-containing vinyl resin (C), the glycidyl group-containing vinyl resin (E), and a reactant thereof, and furthermore, it is more preferable that the content of the releasing agent be equal to or more than 2 parts by mass and equal to or less than 8 parts by mass from the viewpoint of a balance between offset resistance and storage stability. It is possible to produce the toner having more excellent offset resistance by setting the content of the releasing agent to equal to or more than 1 part by mass, and it is possible to suppress the deterioration of storage stability or the deterioration of contamination resistance of a photoreceptor by setting the content of the releasing agent to equal to or less than 10 parts by mass. In addition, since the releasing agent becomes hardly unevenly distributed, separating the releasing agent from the toner is suppressed, and thus it is possible to produce the toner having more excellent durability.

<Charge Controlling Agent>

The toner in the present invention preferably includes a charge controlling agent in order to retain a positive electrostatic charging property or a negative electrostatic charging property. As a charge controlling agent, a well-known one in the related art can be used and these may be used as one kind or may be used in combination of two or more kinds thereof. When a metal-containing azo dye is included as a charge controlling agent, it is possible to make the rising of the charge amount fast, and it is therefore preferable. The metal-containing azo dye is not particularly limited and it is possible to appropriately select the metal-containing azo dye in accordance to a purpose, however, for example, a chromium-containing monoazo dye, a cobalt-containing monoazo dye, an iron-containing monoazo dye, or a combination thereof can be used.

The content of the charge controlling agent in the toner is preferably from 0.05 parts by mass to 10 parts by mass, more preferably from 0.1 parts by mass to 5 parts by mass, and further preferably from 0.2 parts by mass to 3 parts by mass, with respect to 100 parts by mass of the binder resin, in terms of a balance between the charge amount and fluidity of the toner. In addition, as an addition method, a method of adding inside the toner, a method of externally adding, or a combination thereof can be applied.

<Surface Treatment Agent>

As to the toner in the present invention, by adding a surface treatment agent to the surface of the toner, the surface treatment agent preferably exists between the toner and a carrier or between the toners. The powder fluidity, storage stability, electrification stability, and environmental stability can be improved and it is also possible to further improve a lifetime of a developer, by adding the surface treatment agent.

As a surface treatment agent, a well-known one in the related art can be used. For example, a fine silica powder, a fine titanium oxide powder, a hydrophobic substance thereof, and the like are included. As a fine silica powder, a wet silica, a dry silica, a complex of a dry silica and a metal oxide, or the like can be used, and furthermore, one in which these are subjected to a hydrophobic treatment with an organic silicon compound or the like can be used. As a hydrophobic treatment, for example, a method of treating a fine silica powder produced by a vapor phase oxidation of a silicon halogenated compound with a silane compound and then treating with an organic silicon compound, and the like are included. As a silane compound used in a hydrophobic treatment, for example, hexamethyl disilazane, trimethyl silane, trimethyl chlorosilane, trimethyl ethoxysilane, dimethyl dichlorosilane, methyl trichlorosilane, allyldimethyl chlorosilane, allylphenyl dichlorosilane, benzyldimethyl chlorosilane, bromomethyl dimethylchlorosilane, α-chloroethyl trichlorosilane, β-chloroethyl trichlorosilane, chloromethyl dimethylchlorosilane, triorganosilyl mercaptan, trimethylsilyl mercaptan, triorganosilyl acrylate, vinyldimethyl acetoxysilane, dimethyldiethoxy silane, dimethyldimethoxy silane, diphenyldiethoxy silane, hexamethyl disiloxane, 1,3-divinyl tetramethyl disiloxane, 1, 3-diphenyl tetramethyl disiloxane, and the like are included. As an organic silicon compound used in hydrophobic treatment, for example, silicone oils such as dimethyl silicone oil, methylphenyl silicone oil, a-methyl styrene-modified silicone oil, chlorophenyl silicone oil, or fluorine-modified silicone oil are included. In addition, one in which a fine titanium oxide powder is subjected to an oil treatment, fine particles of a vinyl resin of 0.03 μm to 1 μm, or the like may also be used.

As a surface treatment agent other than the above, a lubricant such as polyethylene fluoride, zinc stearate, or polyvinylidene fluoride, an abrading agent such as cerium oxide, silicon carbide, strontium titanate, a magnetic powder, or alumina, a conductivity imparting agent such as carbon black, zinc oxide, antimony oxide, or tin oxide, or the like may also be used. Furthermore, as a shape of the surface treatment agent, various shapes such as a particle having a small particle diameter in which the particle diameter is equal to or less than 100 nm, a particle having a large particle diameter in which the particle diameter is equal to or more than 100 nm, octahedron shape, hexahedron shape, needle shape, or fiber shape may be used. The surface treatment agent may be used alone or may be used in combination of two or more kinds thereof.

The content of the surface treatment agent is preferably from 0.1% by mass to 10% by mass and more preferably from 0.1% by mass to 5% by mass, with respect to the entire toner.

<Carrier>

In a case where the toner in the present invention is used as a two component developer, a well-known one in the relater art can be used as a carrier. For example, particles consisting of a metal such as surface-oxidated iron or non-oxidated iron, cobalt, manganese, chromium, copper, zinc, nickel, magnesium, lithium, or rare earthes, and an alloy or an oxide thereof and having the number average particle diameter of 15 μm to 300 μm can be used. As these carriers, one in which the surface thereof is coated with a styrene-based resin, an acrylic-based resin, a silicone-based resin, a polyester resin, a fluorine-based resin, or the like may be used. Furthermore, a magnetic carrier having a magnetic fine particle dispersion type core formed by dispersing magnetic fine particles in the resin and a coating layer including a coating resin which coats the surface of the magnetic fine particle dispersion type core may be used.

The toner obtained by the present invention can be used in well-known various developing processes. For example, there is no limitation, however, a cascade development method, a magnetic brush method, a powder cloud method, a touch-down development method, a so-called micro-toning method using a magnetic toner manufactured by a grinding method as a carrier, a so-called bipolar magnetic toner method obtained the required toner charge by a frictional electrification between the magnetic toners, and the like are included. In addition, the toner obtained by the present invention can also be used in various well-known cleaning methods in the related art such as a fur brush method or a blade method. In addition, the toner obtained by the present invention can be used in various well-known fixing methods in the related art. Specifically, an oil less heat roll method, an oil application heat roll method, a thermal belt fixing method, a flash method, an oven method, a pressure fixing method, and the like are exemplified. In addition, the toner obtained by the present invention may be used in a fixing device in which an electromagnetic induction heating system is employed. Furthermore, the toner obtained by the present invention may be used in an image forming method having an intermediate transfer step.

As described above, according to the binder resin for toner obtained by the present invention and the toner including the same, there is provided the binder resin for toner having a more excellent balance among fixing properties, offset resistance, and durability.

<Method of Manufacturing Toner>

The toner in the present invention is manufactured by a well-known method in the related art using at least the coloring agent and the binder resin for toner in the present invention. For example, after the binder resin and the coloring agent, and other additive agents such as the releasing agent or the electrification adjusting agent as necessary are sufficiently mixed by a powder mixer such as a Henschel mixer, each constituent component is sufficiently mixed by melting and kneading using a kneader such as a twin screw kneader or an open roll kneader. A method in which particles in a range from usually 4 μm to 15 μm are collected by performing pulverizing and classifying and the toner is obtained by sprinkling the surface treatment agent by a powder mixing method after cooling it down, is included. In addition, the toner may be subjected to a spheroidizing treatment by a surface treatment device or the like, as necessary. As a method of the surface treatment, for example, a method of spheroidizing the toner by being flown into the high temperature air jet flow or a method of rounding off the corners of the toner by a mechanical impact is included, and for the purpose of improving the image quality or the like, these surface treatments are performed and the average circularity measured by a flow type particle image measurement device (for example, manufactured by Sysmex Corporation, FPIA-3000) may be adjusted to equal to or more than 0.960.

Hereinbefore, description was given of embodiments in the present invention, these are illustrations in the present invention and various configurations can also be employed other than the above.

EXAMPLE

Hereinafter, specifically, description will be given of the present invention with reference to Examples, however, the present invention is not limited thereto. In addition, a measuring method and a judging method of data are as follows. Furthermore, in Tables, St represents styrene, Mac represents methacrylic acid, BA represents n-butyl acrylate, and GMA represents glycidyl methacrylate.

<Acid Value>

The acid value (AV) in the present Example was calculated as follows. A sample which accurately measured was dissolved in a mixed solvent having a mass ratio of xylene: n-butanol=1:1. The solution was titrated with alcohol of N/10 potassium hydroxide (one in which 5 g of ion-exchange water is added to 7 g of special grade potassium hydroxide to set the solution to 1 L (liter) with a primary ethyl alcohol and the titer=F is standardized using N/10 hydrochloric acid and 1% phenolphthalein solution) standardized in advance and the acid value was calculated from the neutralizing amount in accordance with following expression.

$$\text{Acid value(mgKOH/g)}=(\text{N/10 KOH titration amount (ml)}\times F\times 5.61)/(\text{Sample g}\times 0.01)$$

<Molecular Weight>

The peak molecular weight, the weight average molecular weight (Mw), the number average molecular weight (Mn), and the molecular weight distribution (Mw/Mn) in the present Example were determined by a GPC (gel permeation chromatography) method and are the conversion molecular weight in which a calibration curve is created by monodispersed standard polystyrene. The measurement conditions are as follows.

GPC device: SHODEX (registered trademark) GPC SYSTEM-21 (manufactured by SHOWA DENKO K.K.)

Detector: SHODEX (registered trademark) RI SE-31 (manufactured by SHOWA DENKO K.K.)

Column: SHODEX (registered trademark) one GPC KF-G, three GPC KF-807Ls, and one GPC KF-800D (manufactured by SHOWA DENKO K.K.) were connected in series in this order to be used.

Solvent: Tetrahydrofuran (THF)
Flow rate: 1.2 ml/minute
Sample concentration: 0.002 g-resin/ml-THF
Injected amount: 100 μL As to the sample solution, a component which is insoluble in THF was removed using a filter right before the measurement.

In the present Example, the molecular weight of the main peak, the weight average molecular weight (Mw), the number average molecular weight (Mn), and the molecular weight distribution (Mw/Mn) were determined as the molecular weight by the method described above.

<Epoxy Value>

The epoxy value was calculated by the following procedure. 0.2 g to 5 g of the resin sample was accurately measured and put into a 200 ml conical flask. Afterward, 25 ml of dioxane was added thereto and dissolved. 25 ml of 1/5 N hydrochloric acid solution (a dioxane solvent) was added thereto, and the conical flask was sealed to be thoroughly mixed. Afterward, the solution was quietly placed for 30 minutes. Then, after 50 ml of toluene-ethanol mixture solution (1:1 capacity ratio) was added, the solution was titrates with 1/10 N sodium hydroxide aqueous solution using Cresol Red as an indicator. Based on the result of titration, the epoxy value (Eq/100 g) was calculated in accordance with the following expression.

Epoxy value (Eq/100 g)=[(B−S)×N×F]/(10×W)

Herein, W is the amount of collected sample (g), B is the amount of the sodium hydroxide aqueous solution (ml) required for a blank test, S is the amount of the sodium hydroxide aqueous solution (ml) required for the test for the sample, N is the normality of the sodium hydroxide aqueous solution, and F is the titer of the sodium hydroxide aqueous solution.

<Viscoelasticity Measurement>

The viscoelasticity measurement in the present invention was determined by the following measurement.

Viscoelasticity device: STRESS TECH Rheometer (manufactured by Rheologica)
Measurement mode: Oscillation strain control
Measurement temperature range: 50° C. to 200° C.
Speed of temperature increase: 2° C./minute
Frequency: 1 Hz (6.28 radian/second)
Gap: 1 mm
Plate: parallel plate
Stress-strain: 1%
Sample shape: thickness 1 mm, columnar shape having a diameter of appropriately 20 mm <THF Insoluble Content>

The THF insoluble content in the binder resin in the present invention was determined as follow.

After 0.4 g of a resin and 39.5 g of THF were put into a 50 ml sample tube with a lid made of glass and this sample tube was stirred under conditions of a rotation speed of 50 rpm and a temperature of 22° C. for 48 hours, it was placed at 22° C. for 48 hours. Afterwards, the weight was measured after 5 g of a supernatant liquid in the sample tube was dried at 150° C. for 1 hour, the weight was set to X g, and the THF insoluble content ratio (% by mass) was calculated using the following expression.

$$\text{THF insoluble content (\% by mass)} = \frac{(0.4/(0.4+39.5)) - X/5}{0.4/(0.4+39.5)} \times 100$$

Next, hereinafter, the evaluation methods of the toner conducted in the present invention will be described.

1. Fixing Properties

After an unfixed image was formed using a copying machine remodeled a commercial electrophotographic copying machine, the unfixed image was fixed at a fixing speed of a heat roller of 190 mm/second at 130° C. using a heat roller fixing device remodeled a fixing unit in a commercial copying machine. A load of 1.0 kgf was applied to the obtained fixed image by a sand eraser (manufactured by TOMBOW PENCIL CO., LTD.), the obtained fixed image was rubbed 6 times and the image density before and after the rubbing test was measured by a Macbeth type reflection densitometer. The image density after rubbing/the image density before rubbing×100 was calculated as a fixing ratio and was determined by the following evaluation criteria. Moreover, the heat roller fixing device used herein had no silicone oil supply mechanism. In addition, the environmental conditions were set to a normal temperature and normal pressure (temperature 22° C., relative humidity 55%).

(Evaluation criteria)
A: 50%≤S Fixing ratio
B: 40%<Fixing ratio<50%
C: Fixing ratio ≤40%

2. Offset resistance

The evaluation of offset resistance was performed according to the measurement of evaluation of fixing properties described above.

That is, the unfixed image was produced using the copying machine. Afterward, a fixing treatment was performed by the heat roller fixing device described above and whether a toner stain is generated at the non-image portion was observed. A state in which the preset temperature of a heat roller of the heat roller fixing device was risen from 100° C. up to 250° C. by sequentially 5° C. was repeated and the width of the preset temperature in which the toner stain was not generated was set to the temperature width of offset resistance. In addition, an atmosphere of the copying machine was set to a temperature of 22° C. and a relative humidity of 55%.

(Evaluation Criteria)
A: 110° C.≤Temperature width of offset resistance
B: 90° C.≤Temperature width of offset resistance <110° C.
C: Temperature width of offset resistance <90°

3. Durability 24 g of balls with a diameter of 4 mm made of stainless steel were put into a 10 ml sample tube made of glass and 0.05 g of the toner was added thereto. A lid was put on the sample tube and rotary stirring was performed at 350 rpm for 25 minutes, the particle size distribution of the toner before and after stirring was measured by a Coulter counter. The particle diameter change ratio was calculated by the following expression:

Particle diameter change ratio={(the number median diameter D50 before stirring−the number median diameter D50 after stirring)/the number median diameter D50 before stirring}×100 was determined by the following criteria.

(Evaluation criteria)
A: Particle diameter change ratio ≤21%
B: 21%<Particle diameter change ratio ≤23%
C: 23%<Particle diameter change ratio 4. Productivity When the toner was manufactured, one which was kneaded by a twin screw kneader and cooled down was taken to be pulverized, the particle size of 10 mesh-under to 16 mesh-on was controlled, 150 g thereof was pulverized using a jet mill (LABO Jet: manufactured by Nippon Pneumatic Mfg. Co., Ltd.) under certain conditions for 30 minutes, and an yield of the toner was measured. The particle size distribution was measured by a Coulter counter and the productivity was calculated from the following expression:

Productivity={(the yield of the toner g per unit time)/the weight g of one particle of the toner determined from the volume median diameter D50}/10$^{10}$ was determined by the following criteria.
(Evaluation criteria)
A: 100≤Productivity
B: 95≤Productivity <100
C: Productivity <95

Example of Manufacturing Glycidyl Group-Containing Vinyl Resin (E)

Example of Manufacturing E-1

50 parts by mass of xylene was put into a flask which was replaced with nitrogen, the temperature was risen, a mixture liquid in which 0.5 parts by mass of di-t-butyl peroxide was mixed and dissolved in 100 parts by mass of a monomer described in Table 1 in advance was continuously added over 5 hours under reflux of xylene, and the reflux was further continued for 1 hour. Afterward, while the internal temperature was maintained at 130° C., 0.5 parts by mass of di-t-butyl peroxide was added thereto and the reaction was continued for 2 hours to obtain a polymerization liquid. The polymerization liquid was flashed at 160° C. in a vessel under 1.33 kPa to remove a solvent or the like and a resin E-1 was obtained. The physical property values thereof are shown in Table 1.

TABLE 1

(Glycidyl group-containing resin Crosslinked agent E)

| | Monomer composition | | | | | Physical properties | |
|---|---|---|---|---|---|---|---|
| Name of resin | St wt % | BA wt % | Mac wt % | GMA wt % | Total wt % | Peak molecular weight ×10$^4$ | Epoxy Value Eq/100 g |
| E-1 | 76.0 | 19.0 | 0.0 | 5.0 | 100 | 5.1 | 0.035 |

Example of Manufacturing Low Molecular Weight Vinyl Resin (L) (L)

Example of Manufacturing L-1

100 parts by mass of xylene was put into a flask which was replaced with nitrogen, the temperature was risen, a mixture liquid in which 10 parts by mass of t-butyl peroxy-2-ethylhexanoate was mixed and dissolved in 100 parts by mass of a monomer described in Table 2 in advance was continuously added over 5 hours under reflux of xylene, and the reflux was further continued for 1 hour. Afterward, while the internal temperature was maintained at 98° C., 0.5 parts by mass of t-butyl peroxy-2-ethylhexanoate was further added thereto and the reaction was continued for 1 hour, 0.5 parts by mass of t-butyl peroxy-2-ethylhexanoate was further added thereto and the reaction was continued for 2 hours, and a polymerization liquid of L-1 was obtained. The physical property values thereof are shown in Table 2.

Example of Manufacturing L-2

75 parts by mass of xylene was put into a flask which was replaced with nitrogen, the temperature was risen, a mixture liquid in which 5 parts by mass of t-butyl peroxy-2-ethylhexanoate was mixed and dissolved in 100 parts by mass of a monomer described in Table 2 in advance was continuously added over 5 hours under reflux of xylene, and the reflux was further continued for 1 hour. Afterward, while the internal temperature was maintained at 98° C., 0.5 parts by mass of t-butyl peroxy-2-ethylhexanoate was further added thereto and the reaction was continued for 1 hour, 0.5 parts by mass of t-butyl peroxy-2-ethylhexanoate was further added thereto and the reaction was continued for 2 hours, and a polymerization liquid of L-2 was obtained. The physical property values thereof are shown in Table 2.

Example of Manufacturing L-3

75 parts by mass of xylene was put into a flask which was replaced with nitrogen, the temperature was risen, a mixture liquid in which 2 parts by mass of t-butyl peroxy-2-ethylhexanoate was mixed and dissolved in 100 parts by mass of a monomer described in Table 2 in advance was continuously added over 5 hours under reflux of xylene, and the reflux was further continued for 1 hour. Afterward, while the internal temperature was maintained at 98° C., 0.5 parts by mass of t-butyl peroxy-2-ethylhexanoate was further added thereto and the reaction was continued for 1 hour, 0.5 parts by mass of t-butyl peroxy-2-ethylhexanoate was further added thereto and the reaction was continued for 2 hours, and a polymerization liquid of L-3 was obtained. The physical property values thereof are shown in Table 2.

Example of Manufacturing L-4

50 parts by mass of xylene was put into a flask which was replaced with nitrogen, the temperature was risen, a mixture liquid in which 1.8 parts by mass of t-butyl peroxy-2-ethylhexanoate was mixed and dissolved in 100 parts by mass of a monomer described in Table 2 in advance was continuously added over 5 hours under reflux of xylene, and the reflux was further continued for 1 hour. Afterward, while the internal temperature was maintained at 98° C., 0.5 parts by mass of t-butyl peroxy-2-ethylhexanoate was further added thereto and the reaction was continued for 1 hour, 0.5 parts by mass of t-butyl peroxy-2-ethylhexanoate was further added thereto and the reaction was continued for 2 hours, and a polymerization liquid of L-4 was obtained. The physical property values thereof are shown in Table 2.

TABLE 2

(Low molecular weight vinyl resin (L))

| | Monomer composition | | | Physical properties | |
|---|---|---|---|---|---|
| | | | | Peak molecular | |
| Name of resin | St % by mass | BA % by mass | Mac % by mass | weight ×10⁴ | Acid Value KOHmg/g |
| L-1 | 93.25 | 6.25 | 0.5 | 0.4 | 3 |
| L-2 | 86.5 | 13.0 | 0.5 | 0.8 | 3 |
| L-3 | 79.0 | 20.0 | 1.0 | 1.6 | 7 |
| L-4 | 77.5 | 21.5 | 1.0 | 2.2 | 7 |

Example of Manufacturing High Molecular Weight Vinyl Resin (H)

Example of Manufacturing H-1

40 parts by mass of xylene was put into a flask which was replaced with nitrogen, the temperature was risen, a mixture liquid in which 0.5 parts by mass of di-t-butyl peroxide was mixed and dissolved in 100 parts by mass of a monomer described in Table 3 in advance was continuously added over 5 hours under reflux of xylene, and the reflux was further continued for 1 hour. Afterward, while the internal temperature was maintained at 130° C., 0.5 parts by mass of di-t-butyl peroxide was further added thereto and the reaction was continued for 1 hour, 0.5 parts by mass of di-t-butyl peroxide was further added thereto and the reaction was continued for 2 hours, and a polymerization liquid of H-1 was obtained. The physical property values thereof are shown in Table 3.

Example of Manufacturing H-2

50 parts by mass of xylene was put into a flask which was replaced with nitrogen, the temperature was risen, a mixture liquid in which 1 part by mass of t-butyl peroxy-2-ethylhexanoate was mixed and dissolved in 100 parts by mass of a monomer described in Table 3 in advance was continuously added over 5 hours under reflux of xylene, and the reflux was further continued for 1 hour. Afterward, while the internal temperature was maintained at 98° C., 0.5 parts by mass of t-butyl peroxy-2-ethylhexanoate was further added thereto and the reaction was continued for 1 hour, 0.5 parts by mass of t-butyl peroxy-2-ethylhexanoate was further added thereto and the reaction was continued for 2 hours, and a polymerization liquid of H-2 was obtained. The physical property values thereof are shown in Table 3.

Example of Manufacturing H-3

20 parts by mass of xylene was put into a flask which was replaced with nitrogen, the temperature was risen, a mixture liquid in which 0.2 parts by mass of t-butyl peroxy-2-ethylhexanoate was mixed and dissolved in 100 parts by mass of a monomer described in Table 3 in advance was continuously added over 4 hours under reflux of xylene, and the reflux was further continued for 1 hour. Afterward, while the internal temperature was maintained at 98° C., 0.3 parts by mass of t-butyl peroxy-2-ethylhexanoate was further added thereto and the reaction was continued for 1 hour, 0.3 parts by mass of t-butyl peroxy-2-ethylhexanoate was further added thereto and the reaction was continued for 1 hour, 0.5 parts by mass of t-butyl peroxy-2-ethylhexanoate was further added thereto and the reaction was continued for 2 hours, and a polymerization liquid of H-3 was obtain. The physical property values thereof are shown in Table 3.

Example of Manufacturing H-4

50 parts by mass of xylene was put into a flask which was replaced with nitrogen, the temperature was risen, a mixture liquid in which 1.8 parts by mass of t-butyl peroxy-2-ethylhexanoate was mixed and dissolved in 100 parts by mass of a monomer described in Table 3 in advance was continuously added over 5 hours under reflux of xylene, and the reflux was further continued for 1 hour. Afterward, while the internal temperature was maintained at 98° C., 0.5 parts by mass of t-butyl peroxy-2-ethylhexanoate was further added thereto and the reaction was continued for 1 hour, 0.5 parts by mass of t-butyl peroxy-2-ethylhexanoate was further added thereto and the reaction was continued for 2 hours, and a polymerization liquid of H-4 was obtained. The physical property values thereof are shown in Table 3.

Example of Manufacturing H-5

68.5 parts by mass of styrene, 23.5 parts by mass of butyl acrylate, and 15 parts by mass of xylene was put into a flask which was replaced with nitrogen and the internal temperature was risen to 110° C. A mixture liquid in which 5 parts by mass of styrene, 3 parts by mass of methacrylic acid, 85 parts by mass of xylene, and 0.3 parts by mass of t-butyl peroxy-2-ethylhexanoate were mixed and dissolved was continuously added thereto over 7 hours and the reaction was further continued for 1 hour. Afterward, while the internal temperature was maintained at 130° C., 0.1 parts by mass of di-t-butyl peroxide was further added thereto and the reaction was continued for 2 hours, 0.1 parts by mass of di-t-butyl peroxide was further added thereto and the reaction was continued for 2 hours, and a polymerization liquid of H-5 was obtained. The physical property values thereof are shown in Table 3.

Example of Manufacturing H-6

After 100 parts by mass of a monomer described in Table 3 was put into a flask which was replaced with nitrogen and the internal temperature was risen to 120° C., bulk polymerization was performed for 8 hours while the same temperature was maintained. Then, after 50 parts by mass of xylene was added and 0.2 parts by mass of tetraethylene glycol diacrylato was added, the temperature was risen to 110° C. After 0.35 parts by mass of 1,1-bis(t-butylperoxy)cyclohexane and 60 parts by mass of xylene which were mixed and dissolved in advance were continuously added over 9 hours while maintaining at the temperature of 110° C., the reaction was continued for 1 hour, 0.21 parts by mass of 1,1-bis(t-butylperoxy)cyclohexane was added and the reaction was continued for 2 hours, 0.52 parts by mass of 1,1-bis(t-butylperoxy)cyclohexane further was added and the reaction was continued for 2 hours, the polymerization was completed, and a polymerization liquid of H-6 was obtained. The physical property values thereof are shown in Table 3.

TABLE 3

(High molecular weight vinyl resin (H))

| | Monomer composition | | | | | Physical properties | |
|---|---|---|---|---|---|---|---|
| | | | | | | Peak | |
| Name of resin | St % by mass | BA % by mass | Mac % by mass | GMA % by mass | Total % by mass | molecular weight ×10$^4$ | Acid Value KOHmg/g |
| H-1 | 71.5 | 25.0 | 3.5 | 0.0 | 100 | 5.2 | 23 |
| H-2 | 73.0 | 23.0 | 4.0 | 0.0 | 100 | 3.1 | 26 |
| H-3 | 72.0 | 25.0 | 3.0 | 0.0 | 100 | 10.0 | 20 |
| H-4 | 74.0 | 22.0 | 4.0 | 0.0 | 100 | 2.2 | 26 |
| H-5 | 73.5 | 23.5 | 3.0 | 0.0 | 100 | 15.1 | 20 |
| H-6 | 74.0 | 23.5 | 2.5 | 0.0 | 100 | 29.8 | 16 |

Example of Manufacturing Carboxy Group-Containing Vinyl Resin (C)

Examples of Manufacturing C-1 to C-17

After each polymerization liquid was mixed so that the mass ratio of the high molecular weight vinyl resin (H) to the low molecular weight vinyl resin (L) became the ratio described in Table 4, the obtained mixture was flashed at 190° C. in a vessel under 1.33 kPa to remove a solvent or the like and resins C-1 to C-17 were obtained. The physical property values thereof are shown in Table 4.

TABLE 4

(Carboxy group-containing resin C)

| | Composition and acid value of carboxy group-containing resin C | | | | | |
|---|---|---|---|---|---|---|
| Carboxy group-containing resin C | High molecular weight H | | Low molecular weight L | | Acid value KOHmg/g | Mw/Mn |
| | Type | % by mass | Type | % by mass | | |
| C-1 | H-1 | 70 | L-1 | 30 | 17 | 10 |
| C-2 | H-1 | 70 | L-2 | 30 | 17 | 7 |
| C-3 | H-1 | 70 | L-3 | 30 | 18 | 6 |
| C-4 | H-2 | 70 | L-2 | 30 | 19 | 7 |
| C-5 | H-3 | 70 | L-2 | 30 | 15 | 12 |
| C-6 | H-1 | 60 | L-2 | 40 | 15 | 8 |
| C-7 | H-1 | 80 | L-2 | 20 | 19 | 8 |
| C-8 | H-4 | 70 | L-2 | 30 | 19 | 4 |
| C-9 | H-5 | 70 | L-2 | 30 | 15 | 17 |
| C-10 | H-1 | 70 | L-4 | 30 | 18 | 6 |
| C-11 | — | — | L-2 | 100 | 3 | 3 |
| C-12 | H-4 | 100 | — | — | 26 | 3 |
| C-13 | H-6 | 40 | L-1 | 60 | 8 | 57 |
| C-14 | H-6 | 30 | L-3 | 70 | 9 | 28 |
| C-15 | H-6 | 30 | L-4 | 70 | 9 | 20 |
| C-16 | H-5 | 40 | L-2 | 60 | 10 | 18 |
| C-17 | H-1 | 50 | L-2 | 50 | 13 | 7 |

Example of Manufacturing Binder Resin (R)

Examples of Manufacturing R-1 to R-21

The carboxy group-containing vinyl resin (C), the glycidyl group-containing vinyl resin (E), and the fatty acid metal salt (M) were mixed so as to have the ratio described in Table 5. The content of the fatty acid metal salt (M) represents part by mass with respect to the total amount of 100 parts by mass of the carboxy group-containing vinyl resin (C) and the glycidyl group-containing vinyl resin (E). Afterward, after kneading and reacting were performed at 25 kg/hr and a motor rotation speed of 1,400 rpm using a twin screw kneader (KEXN S-40 type, manufactured by Kurimoto, Ltd.) in which the temperature was set to 200° C. and this kneaded matter was rapidly cooled down under conditions of a cooling water temperature of 10° C., the amount of cooling water of 90 L/minute, and a belt speed of 6 m/minute using a steel belt cooler (NR3-Hi double cooler, manufactured by NIPPON BELTING CO., LTD.), the kneaded matter was pulverized to obtain binder resins R-1 to R-21. The physical property values thereof are shown in Table 5.

TABLE 5

(Binder resin)

| Binder resin | Carboxy group-containing resin C Type | Glycidyl group-containing resin E Type | C/E compounding ratio | Reaction temperature ° C. | Fatty acid metal salt M | | THF insoluble content % by mass | G' min ×10$^4$ Pa |
|---|---|---|---|---|---|---|---|---|
| | | | | | Type | % by mass | | |
| R-1 | C-1 | E-1 | 93/7 | 200 | Zinc stearate | 0.5 | 23 | 0.5 |
| R-2 | C-2 | E-1 | 93/7 | 200 | Zinc stearate | 0.5 | 24 | 0.5 |
| R-3 | C-3 | E-1 | 93/7 | 200 | Zinc stearate | 0.5 | 24 | 0.6 |
| R-4 | C-4 | E-1 | 93/7 | 200 | Zinc stearate | 0.5 | 17 | 0.3 |
| R-5 | C-5 | E-1 | 93/7 | 200 | Zinc stearate | 0.5 | 29 | 1.6 |
| R-6 | C-6 | E-1 | 93/7 | 200 | Zinc stearate | 0.5 | 22 | 0.4 |
| R-7 | C-7 | E-1 | 93/7 | 200 | Zinc stearate | 0.5 | 25 | 0.6 |
| R-8 | C-2 | E-1 | 93/7 | 200 | Calcium stearate | 0.5 | 24 | 0.6 |
| R-9 | C-2 | E-1 | 93/7 | 200 | Zinc laurate | 0.3 | 23 | 0.5 |
| R-10 | C-8 | E-1 | 93/7 | 200 | Zinc stearate | 0.5 | 2 | 0.1> |
| R-11 | C-9 | E-1 | 93/7 | 200 | Zinc stearate | 0.5 | 40 | 2.1 |
| R-12 | C-10 | E-1 | 93/7 | 200 | Zinc stearate | 0.5 | 25 | 0.6 |
| R-13 | C-11 | E-1 | 93/7 | 200 | Zinc stearate | 0.5 | 1 | 0.1> |

TABLE 5-continued (Binder resin)

| Binder resin | Carboxy group-containing resin C Type | Glycidyl group-containing resin E Type | C/E compounding ratio | Reaction temperature °C. | Fatty acid metal salt M Type | % by mass | THF insoluble content % by mass | G' min ×10⁴ Pa |
|---|---|---|---|---|---|---|---|---|
| R-14 | C-12 | E-1 | 93/7 | 200 | Zinc stearate | 0.5 | 2 | 0.1> |
| R-15 | C-13 | E-1 | 93/7 | 200 | None | 0 | 15 | 0.7 |
| R-16 | C-14 | E-1 | 93/7 | 200 | None | 0 | 14 | 0.4 |
| R-17 | C-15 | E-1 | 93/7 | 200 | None | 0 | 15 | 0.5 |
| R-18 | C-2 | E-1 | 93/7 | 200 | None | 0 | 5 | 0.1 |
| R-19 | C-16 | E-1 | 93/7 | 200 | Zinc stearate | 0.5 | 25 | 1.0 |
| R-20 | C-14 | E-1 | 93/7 | 200 | Zinc stearate | 0.5 | 23 | 0.7 |
| R-21 | C-17 | E-1 | 93/7 | 200 | Zinc stearate | 0.5 | 19 | 0.3 |

Example of Manufacturing Electrophotographic Toner (T)

Examples of Manufacturing T-1 to T-21

6 parts by mass of carbon black (MA100; manufactured by Mitsubishi Chemical Corporation) as a coloring agent, 0.5 parts by mass of a charge adjusting agent (T-77; manufactured by Hodogaya Chemical Co., Ltd.), and 5 parts by mass of polyethylene wax (POLYWAX 725; manufactured by Baker Petrolite corporation) were added with respect to 100 parts by mass of the binder resin (R) described in Table 6 and mixed by a Henschel mixer. Afterward, kneading was performed at 120° C. of a resin temperature of a discharge unit of a twin screw kneader for 30 seconds of a detention time by a twin screw kneader (PCM-30 type, manufactured by Ikegai Corp.). Then, after cooling down, pulverizing, and classifying, 0.5 parts by mass of a hydrophobic silica fine powder (R-812, manufactured by Nippon Aerosil Co., Ltd.) and 0.2 parts by mass of hydrophobic titanium oxide (NKT-90, manufactured by Nippon Aerosil Co., Ltd.) were added with respect to 100 parts by mass of the toner particles to obtain toners T-1 to T-21 in which a volume median diameter D50 measured by a Coulter counter was approximately 7.5 μm.

Examples of Manufacturing T-22

A toner T-22 was obtained in the same way as an example of manufacturing T-18, except adding 4.5 parts by mass of polyethylene wax (POLYWAX 725; manufactured by Baker Petrolite corporation) and 0.5 parts by mass of zinc stearate as a releasing agent.

Examples 1 to 10 and Comparative Examples 1 to 12

97% by mass of a carrier (manufactured by Powdertech Co., Ltd., F-150) was mixed with respect to 3% by mass of the toner described in Table 6 to produce a developer and various evaluations were conducted. The results thereof are shown in Table 6.

TABLE 6

(Evaluation result of toner performance)

| Example/Comparative Example No. | Toner | Binder resin | Fixing properties | Offset resistance | Durability | Productivity |
|---|---|---|---|---|---|---|
| Example 1 | T-1 | R-1 | A | A | A | A |
| Example 2 | T-2 | R-2 | A | A | A | A |
| Example 3 | T-3 | R-3 | A | A | A | A |
| Example 4 | T-4 | R-4 | A | A | B | A |
| Example 5 | T-5 | R-5 | B | A | A | B |
| Example 6 | T-6 | R-6 | A | A | A | A |
| Example 7 | T-7 | R-7 | B | A | A | A |
| Example 8 | T-8 | R-8 | A | A | A | A |
| Example 9 | T-9 | R-9 | A | A | A | A |
| Comparative Example 1 | T-10 | R-10 | A | C | C | A |
| Comparative Example 2 | T-11 | R-11 | C | A | A | C |
| Comparative Example 3 | T-12 | R-12 | C | A | A | A |
| Comparative Example 4 | T-13 | R-13 | A | C | C | A |
| Comparative Example 5 | T-14 | R-14 | A | C | C | A |
| Comparative Example 6 | T-15 | R-15 | B | A | C | A |
| Comparative Example 7 | T-16 | R-16 | B | A | C | A |
| Comparative Example 8 | T-17 | R-17 | C | A | C | A |
| Comparative Example 9 | T-18 | R-18 | A | C | A | A |
| Comparative Example 10 | T-19 | R-19 | B | A | C | A |
| Comparative Example 11 | T-20 | R-20 | B | A | C | A |
| Example 10 | T-21 | R-21 | A | B | B | A |
| Comparative Example 12 | T-22 | R-18 | A | C | A | A |

As it is clear from Table 6, any binder resin for toner manufactured by the present invention and any toner using the resin were excellent in a balance of various characteristics.

This application claims a priority based on Japanese Patent Application No. 2012-116628, filed on May 22, 2012, and the disclosure of which is incorporated by reference herein in its entirety.

The invention claimed is:

1. A binder resin for toner containing a carboxy group-containing vinyl resin (C), a glycidyl group-containing vinyl resin (E), a reactant thereof, and a fatty acid metal salt (M) represented by the following general formula (1):

$$(C_nH_{2n+1}COO)_m\text{-M} \qquad (1)$$

wherein n is an integer of 11 to 22, m is 2, and M is a metal atom selected from Zn and Ca, wherein the carboxy group-containing vinyl resin (C) includes a high molecular weight vinyl resin (H) having a peak in a region in which the molecular weight is equal to or more than $2.5 \times 10^4$ and equal to or less than $1.2 \times 10^5$ in the molecular weight distribution of a tetrahydrofuran soluble content measured by gel permeation chromatography and a low molecular weight vinyl resin (L) having a peak in a region in which the molecular weight is equal to or more than $2 \times 10^3$ and equal to or less than $2 \times 10^4$ in the molecular weight distribution of a tetrahydrofuran soluble content measured by gel permeation chromatography, wherein the reactant of the carboxy group-containing vinyl resin (C) and the glycidyl group-containing vinyl resin (E) is formed in the presence of the fatty acid metal salt (M), and wherein the mass ratio (H/L) of the high molecular weight vinyl resin (H) to the low molecular weight vinyl resin (L) in the carboxy group-containing vinyl resin (C) is from 55/45 to 85/15.

2. The binder resin for toner according to claim 1, wherein as to the carboxy group-containing vinyl resin (C), the molecular weight distribution (Mw/Mn) is equal to or more than 6 and equal to or less than 15.

3. The binder resin for toner according to claim 1, wherein the minimum value of a storage elastic modulus (G') is equal to or more than $0.2 \times 10^4$ Pa and equal to or less than $2.0 \times 10^4$ Pa at 150° C. to 200° C. in a measurement frequency of 6.28 radian/second.

4. The binder resin for toner according to claim 1 containing equal to or more than 10% by mass and equal to or less than 40% by mass of a tetrahydrofuran insoluble component with respect to the entire resin.

5. A toner comprising the binder resin for toner according to claim 1 and a coloring agent.

6. A method of manufacturing a binder resin for toner, comprising a step of performing a crosslinking reaction by melting and kneading a carboxy group-containing vinyl resin (C) including a high molecular weight vinyl resin (H) having a peak in a region in which the molecular weight is equal to or more than $2.5 \times 10^4$ and equal to or less than $1.2 \times 10^5$ in the molecular weight distribution of a tetrahydrofuran soluble content measured by gel permeation chromatography and a low molecular weight vinyl resin (L) having a peak in a region in which the molecular weight is equal to or more than $2 \times 10^3$ and equal to or less than $2 \times 10^4$ in the molecular weight distribution of a tetrahydrofuran soluble content measured by gel permeation chromatography, and a glycidyl group-containing vinyl resin (E) in the presence of a fatty acid metal salt (M) represented by the following general formula (1):

$$(C_nH_{2n+1}COO)_m\text{-M} \qquad (1)$$

wherein n is an integer of 11 to 22, m is 2, and M is a metal atom selected from Zn and Ca, and wherein the mass ratio (H/L) of the high molecular weight vinyl resin (H) to the low molecular weight vinyl resin (L) in the carboxy group-containing vinyl resin (C) is from 55/45 to 85/15.

* * * * *